(12) United States Patent
Mann et al.

(10) Patent No.: US 8,105,409 B2
(45) Date of Patent: Jan. 31, 2012

(54) FILTER RETENTION SYSTEM

(75) Inventors: Richard Michael Ashley Mann, Reading (GB); Christina Goodrick-Meech, Portsmouth (GB); Beverley Dunstan, Eastleigh (GB); William Keith Albert Eyers, Chobham (GB)

(73) Assignee: General Electric Company, Schenectady, NY (US)

( * ) Notice: Subject to any disclaimer, the term of this patent is extended or adjusted under 35 U.S.C. 154(b) by 505 days.

(21) Appl. No.: 12/363,682

(22) Filed: Jan. 30, 2009

(65) Prior Publication Data

US 2010/0192528 A1    Aug. 5, 2010

(51) Int. Cl.
*B01D 59/50* (2006.01)
(52) U.S. Cl. ............... 55/483; 55/484; 55/493; 55/495; 55/496; 55/501; 55/502; 55/507; 55/511; 55/490; 55/DIG. 31
(58) Field of Classification Search ................ 55/483, 55/484, 493, 495, 496, 501, 502, 505, 507, 55/511, 490, DIG. 31
See application file for complete search history.

(56) References Cited

U.S. PATENT DOCUMENTS

| | | | |
|---|---|---|---|
| 1,953,156 A * | 4/1934 | Verner Dahlman | ............. 55/502 |
| 279,906 A | 5/1957 | Reid | |
| 3,093,401 A | 6/1963 | Hagendoorn | |
| 3,360,910 A | 1/1968 | Soltis | |
| 3,423,908 A | 1/1969 | Hart | |
| 3,432,999 A | 3/1969 | Schraner | |
| 3,487,768 A | 1/1970 | Watson | |
| 3,552,704 A | 1/1971 | Pond | |
| 3,576,096 A | 4/1971 | Rivers | |
| 3,733,793 A | 5/1973 | Young | |
| 3,740,934 A | 6/1973 | Shuler | |
| 3,750,374 A | 8/1973 | Neumann | |
| 3,759,017 A | 9/1973 | Young | |
| 3,774,946 A | 11/1973 | Hammann | |
| 3,837,149 A | 9/1974 | West et al. | |
| 3,859,965 A | 1/1975 | Hatz et al. | |
| 3,860,273 A | 1/1975 | Petrus | |
| 3,891,253 A | 6/1975 | Revell | |
| 3,916,817 A | 11/1975 | Kemp | |
| 3,926,155 A | 12/1975 | Hatz et al. | |
| 3,949,356 A | 4/1976 | Fuzzell et al. | |
| 3,966,163 A | 6/1976 | Getzin | |
| 3,993,464 A * | 11/1976 | Pelabon | ......................... 55/480 |
| 3,999,969 A | 12/1976 | Shuler | |
| 4,061,373 A | 12/1977 | Revell | |
| 4,171,211 A | 10/1979 | Carter | |

(Continued)

FOREIGN PATENT DOCUMENTS

CA     1148874 A1    6/1983

(Continued)

*Primary Examiner* — Jason M Greene
*Assistant Examiner* — Dung H Bui
(74) *Attorney, Agent, or Firm* — Fletcher Yoder, PC (57) ABSTRACT

Embodiments of the present invention include a filter latching device for use in a filtering system that provides filtered intake air for a power generation facility. In some embodiments, a filter latch is provided that includes a hinge coupled to the filter frame and an S-shaped retaining plate rotatably coupled to the hinge. In some embodiments, the S-shaped retaining plate provides an over-center action mechanism that locks the retaining plate in place against a sealing flange and a camming surface that provides gradually increasing pressure on the sealing flange as the latch is engaged.

33 Claims, 7 Drawing Sheets

U.S. PATENT DOCUMENTS

| | | | |
|---|---|---|---|
| 4,178,159 A | 12/1979 | Fecteau | |
| 4,193,844 A | 3/1980 | Neumann et al. | |
| 4,217,122 A | 8/1980 | Shuler | |
| 4,224,765 A | 9/1980 | Song | |
| 4,266,955 A | 5/1981 | Hackney | |
| 4,266,956 A | 5/1981 | Revell | |
| 4,276,069 A | 6/1981 | Miller | |
| 4,323,379 A | 4/1982 | Shearin | |
| 4,472,184 A | 9/1984 | Neumann et al. | |
| 4,488,888 A | 12/1984 | Doyle | |
| 4,497,287 A | 2/1985 | Schleiermacher et al. | |
| 4,498,914 A | 2/1985 | Ericksen | |
| 4,519,823 A * | 5/1985 | Kinney et al. | 55/493 |
| 4,521,234 A * | 6/1985 | Peebles et al. | 55/481 |
| 4,555,255 A * | 11/1985 | Kissel | 55/355 |
| 4,569,803 A | 2/1986 | Takakura et al. | |
| 4,600,419 A * | 7/1986 | Mattison | 55/484 |
| 4,608,066 A * | 8/1986 | Cadwell, Jr. | 55/385.1 |
| 4,632,681 A * | 12/1986 | Brunner | 55/493 |
| 4,648,311 A | 3/1987 | Slosiarek et al. | |
| 4,701,196 A | 10/1987 | Delany | |
| 4,707,168 A | 11/1987 | Mizutani | |
| 4,710,208 A * | 12/1987 | Ziemer et al. | 55/355 |
| 4,808,203 A * | 2/1989 | Sabourin | 55/492 |
| 4,846,859 A | 7/1989 | Nobiraki et al. | |
| 4,860,420 A * | 8/1989 | Cadwell et al. | 29/890.14 |
| 4,889,543 A | 12/1989 | Burt | |
| 4,909,208 A | 3/1990 | Krisztics | |
| 4,944,142 A | 7/1990 | Sueshig et al. | |
| 4,946,484 A * | 8/1990 | Monson et al. | 55/385.2 |
| 4,976,757 A | 12/1990 | Helmus | |
| 4,978,375 A * | 12/1990 | Il Yoo | 55/493 |
| 4,986,050 A | 1/1991 | Brunetti et al. | |
| 5,003,974 A | 4/1991 | Mou | |
| 5,014,608 A | 5/1991 | Benson et al. | |
| 5,056,423 A | 10/1991 | Koukal et al. | |
| 5,062,872 A | 11/1991 | Williams | |
| 5,071,456 A | 12/1991 | Binder et al. | |
| 5,088,299 A | 2/1992 | Peterson | |
| 5,099,374 A | 3/1992 | Ohkita et al. | |
| 5,160,293 A | 11/1992 | Koukal et al. | |
| 5,167,683 A | 12/1992 | Behrendt et al. | |
| 5,273,564 A | 12/1993 | Hill | |
| 5,279,632 A * | 1/1994 | Decker et al. | 55/355 |
| 5,286,201 A | 2/1994 | Yu | |
| 5,291,355 A | 3/1994 | Hatch et al. | |
| 5,295,602 A | 3/1994 | Swanson | |
| 5,313,759 A | 5/1994 | Chase, III | |
| 5,331,748 A | 7/1994 | Miller, Jr. | |
| 5,332,409 A | 7/1994 | Dralle | |
| 5,379,609 A | 1/1995 | Matsumoto et al. | |
| 5,417,205 A | 5/1995 | Wang | |
| 5,417,610 A * | 5/1995 | Spransy | 454/187 |
| 5,421,307 A | 6/1995 | Andress et al. | |
| 5,422,795 A | 6/1995 | Liu | |
| 5,454,756 A * | 10/1995 | Ludwig | 454/296 |
| 5,458,772 A * | 10/1995 | Eskes et al. | 210/238 |
| 5,512,074 A * | 4/1996 | Hanni et al. | 55/484 |
| 5,512,086 A | 4/1996 | Glucksman | |
| 5,514,197 A * | 5/1996 | Den | 55/405 |
| 5,554,203 A * | 9/1996 | Borkent et al. | 55/378 |
| 5,575,826 A * | 11/1996 | Gillingham et al. | 55/284 |
| 5,601,626 A | 2/1997 | Hori et al. | |
| 5,602,700 A | 2/1997 | Viskochil et al. | |
| 5,617,825 A | 4/1997 | Altmann et al. | |
| 5,637,124 A * | 6/1997 | Diachuk | 55/342 |
| 5,655,825 A | 8/1997 | Anoszko | |
| 5,669,947 A | 9/1997 | Diachuk | |
| 5,725,624 A | 3/1998 | Ernst et al. | |
| 5,733,348 A | 3/1998 | Skarsten | |
| 5,753,002 A | 5/1998 | Glucksman | |
| 5,759,239 A | 6/1998 | Yu | |
| 5,788,729 A * | 8/1998 | Jurgensmeyer | 55/496 |
| 5,797,975 A * | 8/1998 | Davis | 55/493 |
| 5,820,235 A | 10/1998 | Tsai | |
| 5,824,125 A | 10/1998 | Sherwood | |
| 5,833,727 A | 11/1998 | Sharsten | |
| 5,871,556 A * | 2/1999 | Jeanseau et al. | 55/385.2 |
| 5,904,744 A | 5/1999 | Kagan | |
| 5,984,991 A | 11/1999 | Glucksman | |
| 6,001,145 A | 12/1999 | Hammes | |
| 6,099,612 A * | 8/2000 | Bartos | 55/481 |
| 6,117,202 A * | 9/2000 | Wetzel | 55/385.2 |
| 6,149,701 A * | 11/2000 | Ellingson | 55/493 |
| 6,152,980 A | 11/2000 | Culwell | |
| 6,190,431 B1 * | 2/2001 | Jeanseau et al. | 55/385.2 |
| 6,264,713 B1 * | 7/2001 | Lewis, II | 55/481 |
| 6,267,793 B1 * | 7/2001 | Gomez et al. | 55/385.2 |
| 6,270,546 B1 * | 8/2001 | Jeanseau et al. | 55/385.2 |
| 6,293,983 B1 * | 9/2001 | More | 55/486 |
| 6,309,296 B1 | 10/2001 | Schwenk et al. | |
| 6,312,327 B1 | 11/2001 | Hachmann et al. | |
| 6,319,300 B1 | 11/2001 | Chen | |
| 6,337,782 B1 | 1/2002 | Guerin et al. | |
| 6,339,521 B1 | 1/2002 | Durrum et al. | |
| 6,351,920 B1 * | 3/2002 | Hopkins et al. | 52/506.08 |
| 6,361,578 B1 * | 3/2002 | Rubinson | 55/487 |
| 6,362,937 B1 | 3/2002 | Gibbs et al. | |
| 6,371,846 B1 | 4/2002 | Powell et al. | |
| 6,447,566 B1 * | 9/2002 | Rivera et al. | 55/482 |
| 6,451,079 B1 * | 9/2002 | Lange et al. | 55/379 |
| 6,468,324 B1 | 10/2002 | Beier | |
| 6,485,538 B1 * | 11/2002 | Toyoshima | 55/490 |
| 6,497,739 B2 * | 12/2002 | McGill | 55/385.2 |
| 6,554,880 B1 * | 4/2003 | Northcutt | 55/385.2 |
| 6,716,267 B2 * | 4/2004 | Lawlor, Sr. | 55/506 |
| 6,858,055 B2 * | 2/2005 | McGill | 55/385.2 |
| 7,077,835 B2 | 7/2006 | Robinson et al. | |
| 7,097,692 B2 | 8/2006 | Southland et al. | |
| 7,108,251 B2 | 9/2006 | Mueller | |
| 7,117,910 B2 | 10/2006 | Akahori | |
| 7,128,771 B2 * | 10/2006 | Harden | 55/385.2 |
| 7,261,757 B2 * | 8/2007 | Duffy | 55/502 |
| 7,323,028 B2 * | 1/2008 | Simmons | 55/495 |
| 7,332,012 B2 * | 2/2008 | O'Connor et al. | 55/493 |
| 7,364,602 B2 | 4/2008 | Wu et al. | |
| 7,410,520 B2 * | 8/2008 | Nowak et al. | 55/482 |
| 7,413,587 B2 * | 8/2008 | Beier | 55/483 |
| 7,422,613 B2 * | 9/2008 | Bockle et al. | 55/318 |
| 7,452,396 B2 * | 11/2008 | Terlson et al. | 55/496 |
| 7,537,630 B2 * | 5/2009 | Schuld et al. | 55/496 |
| 7,588,618 B2 * | 9/2009 | Osborne et al. | 55/481 |
| 7,588,629 B2 * | 9/2009 | Osborne et al. | 96/129 |
| 7,662,216 B1 * | 2/2010 | Terres et al. | 95/273 |
| 7,670,401 B2 * | 3/2010 | Whittemore | 55/480 |
| 7,686,869 B2 * | 3/2010 | Wiser et al. | 96/66 |
| 7,776,122 B2 * | 8/2010 | Feldmann | 55/481 |
| 7,799,108 B2 | 9/2010 | Connor et al. | |
| 7,901,476 B2 * | 3/2011 | Kao | 55/379 |
| 7,901,479 B2 * | 3/2011 | Osborne et al. | 55/481 |
| 7,972,401 B2 * | 7/2011 | Stock et al. | 55/483 |
| 7,976,604 B2 * | 7/2011 | Desjardins | 55/503 |
| 2002/0139098 A1 * | 10/2002 | Beier | 55/495 |
| 2003/0075923 A1 | 4/2003 | Lepoutre | |
| 2004/0025996 A1 | 2/2004 | Akahori | |
| 2005/0044828 A1 | 3/2005 | Southland et al. | |
| 2005/0173815 A1 | 8/2005 | Mueller | |
| 2005/0204713 A1 * | 9/2005 | Wu et al. | 55/496 |
| 2005/0279064 A1 * | 12/2005 | Simmons | 55/495 |
| 2005/0284113 A1 | 12/2005 | Jang et al. | |
| 2006/0121768 A1 | 6/2006 | Dworatzek et al. | |
| 2006/0168925 A1 * | 8/2006 | Whittemore | 55/490 |
| 2007/0044441 A1 | 3/2007 | Troxell et al. | |
| 2007/0084168 A1 * | 4/2007 | Ashwood et al. | 55/486 |
| 2007/0169448 A1 * | 7/2007 | Osborne et al. | 55/484 |
| 2007/0199289 A1 | 8/2007 | Bland, Jr. et al. | |
| 2007/0199449 A1 * | 8/2007 | Wiser et al. | 96/69 |
| 2007/0204576 A1 * | 9/2007 | Terlson et al. | 55/496 |
| 2007/0220851 A1 * | 9/2007 | Parker et al. | 55/484 |
| 2007/0220854 A1 * | 9/2007 | Feldmann | 55/490 |
| 2008/0120953 A1 | 5/2008 | Volkmer et al. | |
| 2008/0184996 A1 | 8/2008 | Colorado | |
| 2009/0113862 A1 * | 5/2009 | Connor et al. | 55/484 |
| 2009/0320426 A1 * | 12/2009 | Braunecker et al. | 55/511 |
| 2010/0139225 A1 * | 6/2010 | Mammarella et al. | 55/493 |
| 2010/0192528 A1 * | 8/2010 | Mann et al. | 55/483 |

| | | | | | | |
|---|---|---|---|---|---|---|
| 2010/0229514 A1* | 9/2010 | Ayshford et al. ............... 55/482 | GB | 1072791 | | 6/1967 |
| 2010/0251678 A1* | 10/2010 | Mann et al. .................... 55/483 | GB | 1082503 | | 9/1967 |
| 2010/0251681 A1* | 10/2010 | Gebert ......................... 55/495 | GB | 1104643 | A | 2/1968 |
| | | | GB | 1190959 | | 5/1970 |
| | FOREIGN PATENT DOCUMENTS | | GB | 1367734 | A | 9/1974 |
| CA | 2016596AA | 11/1990 | GB | 2302292 | A | 1/1997 |
| CA | 1322535 A1 | 9/1993 | GB | 2302292 | B2 | 2/1998 |
| CA | 2147206AA | 10/1995 | GB | 2340596 | A | 2/2000 |
| CA | 2204538 C | 3/2001 | GB | 2340596 | B | 7/2002 |
| CA | 2496056 A | 10/2005 | GB | 2415398 | A | 12/2005 |
| CA | 2551701AA | 12/2006 | GB | 2415398 | A1 | 12/2005 |
| CA | 2512414AA | 1/2007 | JP | 57007219 | A2 | 1/1982 |
| CA | 2565992 A | 4/2007 | JP | 57031738 | A2 | 2/1982 |
| CA | 2227816 C | 8/2007 | JP | 60060433 | A2 | 4/1985 |
| CA | 2602631 A | 3/2008 | JP | 60060435 | A2 | 4/1985 |
| CN | 1169382 A | 1/1998 | JP | 61240039 | A2 | 10/1986 |
| CN | 1752553 A | 3/2006 | JP | 63009742 | A2 | 1/1988 |
| CN | 1932278 | 3/2007 | JP | 02140525 | | 5/1990 |
| CN | 1963166 A | 5/2007 | JP | 02252185 | A2 | 10/1990 |
| DE | 4211303 A1 | 10/1993 | JP | 03207935 | | 9/1991 |
| DE | 4412474 A1 | 10/1995 | JP | 05141645 | | 6/1993 |
| DE | 4438007 A1 | 5/1996 | JP | 05141689 | | 6/1993 |
| DE | 4412474 C2 | 8/1997 | JP | 07098149 | A2 | 4/1995 |
| DE | 10002343 A1 | 7/2000 | JP | 08224417 | A2 | 9/1996 |
| DE | 20216538 U1 | 2/2003 | JP | 08226574 | A2 | 9/1996 |
| DE | 20218457 U1 | 3/2003 | JP | 09075640 | | 3/1997 |
| DE | 10332984 A1 | 2/2005 | JP | 09155158 | A2 | 6/1997 |
| DE | 10339082 A1 | 3/2005 | JP | 09173892 | A2 | 7/1997 |
| DE | 102005031501 A1 | 1/2007 | JP | 09184656 | A2 | 7/1997 |
| DE | 102006056225 A1 | 6/2008 | JP | 09287812 | A2 | 11/1997 |
| EP | 0065064 A2 | 11/1982 | JP | 09330557 | A2 | 12/1997 |
| EP | 0065064 A3 | 1/1984 | JP | 11059861 | | 3/1999 |
| EP | 0065064 B1 | 11/1986 | JP | 11169614 | A2 | 6/1999 |
| EP | 0225448 A1 | 6/1987 | JP | 2001227814 | | 8/2001 |
| EP | 0232640 A1 | 8/1987 | JP | 2002210426 | | 7/2002 |
| EP | 0264531 | 4/1988 | JP | 2003190049 | A2 | 7/2003 |
| EP | 0318636 A1 | 6/1989 | JP | 2003334410 | A2 | 11/2003 |
| EP | 0398091 A1 | 11/1990 | JP | 2004167323 | A2 | 6/2004 |
| EP | 0453657 A2 | 10/1991 | JP | 2005103356 | A2 | 4/2005 |
| EP | 0453657 A3 | 10/1992 | JP | 2006003002 | A2 | 1/2006 |
| EP | 0318636 B1 | 11/1992 | JP | 2006132895 | A2 | 5/2006 |
| EP | 0555761 A1 | 8/1993 | JP | 2006305508 | A2 | 11/2006 |
| EP | 0560298 A2 | 9/1993 | JP | 2007046588 | A2 | 2/2007 |
| EP | 0620133 A1 | 10/1994 | JP | 2007132607 | A2 | 5/2007 |
| EP | 0634203 A2 | 1/1995 | JP | 2007296481 | A2 | 11/2007 |
| EP | 0634203 A3 | 4/1995 | KR | 20010048149 | A | 6/2001 |
| EP | 0560298 A3 | 8/1995 | KR | 20020025646 | A | 4/2002 |
| EP | 0398091 B1 | 1/1996 | KR | 20020055182 | | 7/2002 |
| EP | 0699465 A2 | 3/1996 | KR | 20030034003 | A | 5/2003 |
| EP | 0555761 B1 | 4/1996 | KR | 20030079893 | A | 10/2003 |
| EP | 0699465 A3 | 5/1996 | KR | 20030093063 | A | 12/2003 |
| EP | 0735266 | 10/1996 | KR | 20040076781 | A | 9/2004 |
| EP | 0735266 A1 | 10/1996 | MX | 9601164 | A | 2/1997 |
| EP | 0765517 | 4/1997 | MX | PA02011936 | A | 6/2004 |
| EP | 0620133 B1 | 9/1997 | MX | 5007008 | A | 2/2006 |
| EP | 0765517 A4 | 1/1998 | RO | 0117217 | B1 | 11/2001 |
| EP | 0818337 A2 | 1/1998 | RO | 0118492 | B1 | 5/2003 |
| EP | 0634203 B1 | 8/1998 | RU | 2130521 | C1 | 5/1999 |
| EP | 0856093 A1 | 8/1998 | RU | 2209736 | C2 | 8/2003 |
| EP | 0560298 B1 | 6/1999 | RU | 2236122 | C1 | 9/2004 |
| EP | 0951335 A1 | 10/1999 | SK | 0280735 | B6 | 7/2000 |
| EP | 0818337 A3 | 12/1999 | TW | 0247078 | B | 1/2006 |
| EP | 0699465 B1 | 2/2001 | WO | 08907225 | A1 | 8/1989 |
| EP | 0765517 B1 | 5/2001 | WO | WO96327141 | | 10/1996 |
| EP | 1184268 A2 | 3/2002 | WO | WO9807949 | A1 | 2/1998 |
| EP | 0818337 B1 | 8/2002 | WO | WO0181740 | A1 | 11/2001 |
| EP | 0951335 B1 | 5/2003 | WO | WO02066272 | A2 | 8/2002 |
| EP | 1184268 A3 | 10/2003 | WO | WO2005076922 | A2 | 8/2005 |
| EP | 1184268 B1 | 10/2007 | WO | WO2005076922 | A3 | 8/2005 |
| EP | 1884277 A1 | 2/2008 | WO | WO2006080689 | A1 | 8/2006 |
| FR | 2823989 A1 | 10/2002 | WO | WO2007042194 | A1 | 4/2007 |
| FR | 2823989 B1 | 7/2003 | WO | WO2008030138 | A2 | 3/2008 |
| GB | 0682845 | 11/1952 | WO | WO2008030138 | A3 | 3/2008 |
| GB | 0724179 | 2/1955 | WO | WO2008068327 | A1 | 6/2008 |
| GB | 0759992 | 10/1956 | | | | |
| GB | 1045309 A | 10/1966 | * cited by examiner | | | |

FILTER RETENTION SYSTEM

BACKGROUND OF THE INVENTION

The subject matter disclosed herein relates to systems and devices for retaining a filter within a filter holding frame.

Power generation equipment such as gas turbine engines use a large supply of intake air to enable combustion. To maintain suitable performance of the turbine, the intake air is filtered to remove unwanted dust, moisture, and other contaminants. The filters that filter the intake air are typically arranged in an array on a large filter frame located within a filter house. The filters are removable to enable cleaning and replacement of the filters. Often, the filters are held in place by the intake air pressure, which may, in some cases, sufficiently press the filter against the filter receptacle to block air from flowing around the filter. In some applications however, such as wherein the filter frame is tilted, the air pressure alone may not be sufficient to hold the filter in place. Mechanical devices for holding the filter in place have been developed, but they often use substantial amounts of material, are cumbersome to operate, and use loose parts that can potentially damage the turbine. Additionally, typical filter holding mechanisms may permit an operator to inadvertently over-tighten the mechanism, which could damage the filter or inhibit proper sealing. It may be advantageous therefore to provide a device for fastening a filter that is small, inexpensive, easy to use, uses no loose parts, and provides a consistent, controlled level of compression to the filter.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine configured to receive filtered air from a filter assembly. The filter assembly comprises a plurality of filters and a filter holding frame. The filter holding frame includes a plurality of filter cells and a plurality of fasteners. Each of the fasteners includes a first arm coupled to the filter holding frame at a hinge, wherein the arm rotates about the hinge to gradually compress a first filter from a released position to a retained position relative to a first filter cell.

In a second embodiment, a system includes a filter holding frame configured to support a plurality of filters. The filter holding frame includes first and second filter cells, a divider between the first and second filter cells, and a latch coupled to the divider. The latch comprises first and second arms rotatable toward and away from one another and the divider. The first arm is configured to progressively compress a first filter into the first filter cell during rotation of the first arm toward the first filter, and the second arm is configured to progressively compress a second filter into the second filter cell during rotation of the second arm toward the second filter.

In a third embodiment, a system includes a filter latch comprising a hinge and a first arm coupled to the hinge. The first arm comprises an S-shaped plate rotatable about the hinge, and the S-shaped plate is configured to progressively compress a first filter into a first filter cell in a filter frame via engagement of the first filter along a curved surface of the S-shaped plate.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include a filter fastening device for use in a filtering system that provides intake air to machinery in a power generation facility. In particular, some embodiments of the present invention provide a filter fastener or latch rotatably coupled to a filter holding frame by a hinge and configured to rotate toward a filter and gradually compress the filter against a sealing face of the filter holding frame. Furthermore, the latch may be shaped to provide an over-center action, wherein the outward pressure provided by the resiliency of the filter urges the latch into a locked position after the latch rotates through a balance point. Some embodiments may also include an additional latch for retaining a second filter, such as a pre-filter, in a parallel arrangement with the first filter. The latches described herein are small, inexpensive, quick and simple to use, include no loose parts, and provide consistent, predetermined compressive force to the filter.

Figure 1:
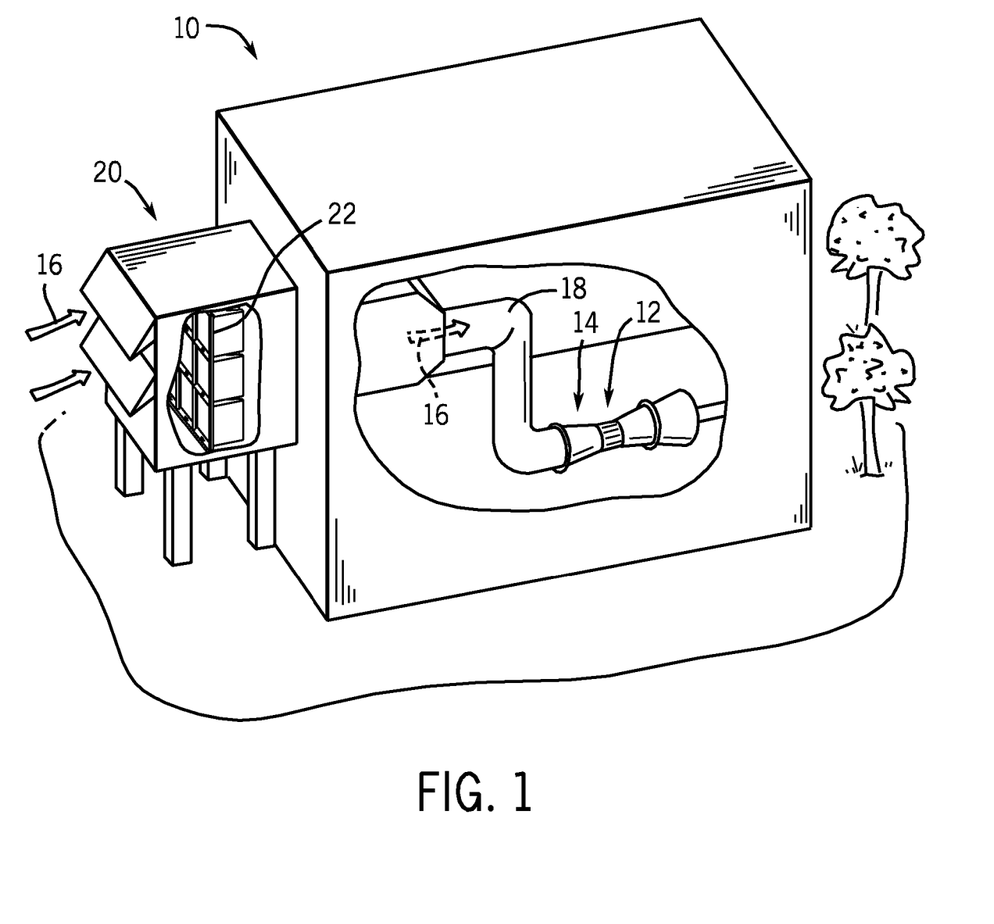
FIG. 1 is a perspective view of an embodiment of a power generation facility with a filter frame that uses novel filter latches.

FIG. 1 is a perspective view of an embodiment of a power generation facility with a filter frame that uses the novel filter latches disclosed herein. The power generation facility 10 includes a gas turbine engine 12 that generates electrical power. The turbine engine 12 includes an air compressor 14 that draws intake air 16 into the turbine engine 12 from the outdoors through air ducts 18. As the intake air 16 enters the facility, it first passes through a filter house 20. Inside the filter house 20, an array of filters, held by one or more filter frames 22, filter the intake air 16 to remove contaminants such as dust, dirt, moisture, salt, carbon and any other contaminants that may tend to reduce the performance of the turbine 12. The filter house 20 may be several stories high, and may house up to several hundred filters, which may be held by several filter frames 22.

Figure 2:
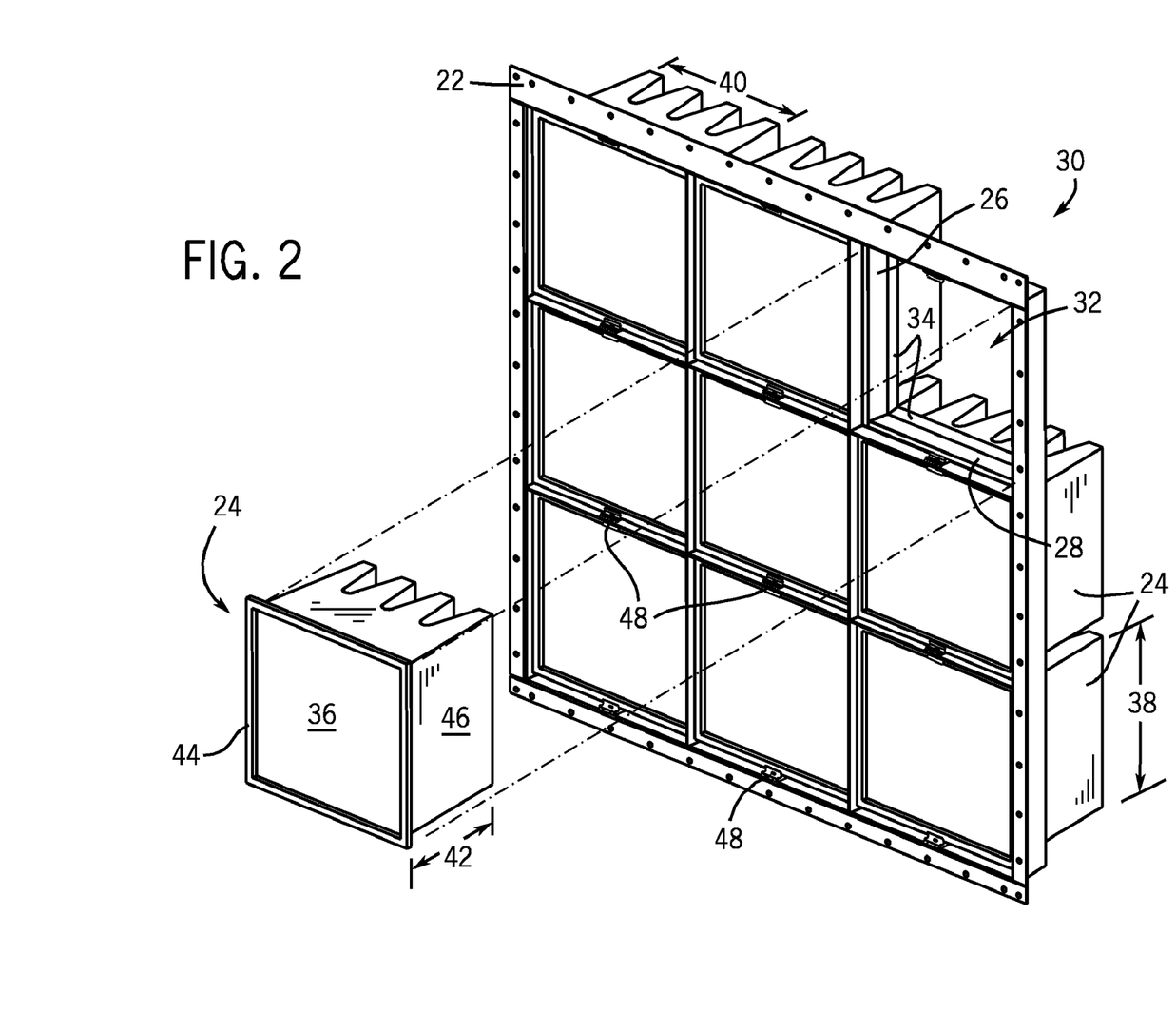
FIG. 2 is a perspective view of an embodiment of the filter frame of FIG. 1.

FIG. 2 is a perspective view illustrating an embodiment of the filter frame of FIG. 1. As shown in FIG. 2, the filter frame 22 includes a set of vertical support panels 26 and horizontal support panels 28 that define filter cells 30. The vertical support panels 26 and horizontal support panels 28 serve, in part, as dividers between the filter cells 30, each of which holds a single air filter 24. Each filter cell 30 may include an aperture 32 through which the filter 24 may pass, and a sealing face 34 against which the filter 24 may be pressed to block air from flowing around the filter 24. The filter 24 may include a filter body 46 that passes through the aperture 32 and a sealing flange 44 disposed about the rim of the outward face 36 of the filter body 46. The sealing flange 44 may be configured to fit inside the filter cell 30 and may be pressed against the sealing face 34. As will be explained further below, a gasket may be disposed between the sealing face 34 and the filter flange 44 to provide an airtight seal between the filter 24 and the sealing face 34.

The filters 24 may be any suitable type, such as bag filters or mini-pleat filters, for example. In some embodiments, the filters 24 may be high-efficiency AltairSupernova™ filters, available from General Electric. Additionally, the filters 24 may also be any suitable size. For example, in some embodiments, the filter height 38 and width 40 may be approximate 600 mm, the filter depth 42 may be approximately 400 to 500 millimeters, and each filter may weight approximately 15 kilograms. Additionally, in some embodiments, the filter cells 30 and/or the filter frame 22 may be titled to provide suitable drainage for moisture, which may collect on the outside of the filter 24. In some embodiments, which will be described further below with reference to FIGS. 7-10, the filter frame may also be configured to retain an additional layer of filters, such as pre-filters, over the main filters 24. Also included in the filter frame 22 are several fasteners or latches 48, which hold the filters within the frame and provide sufficient compression to the sealing flange 44 to provide the airtight seal between the filter 24 and the sealing face 34, as mentioned above. The filter latches 48 may be better understood with reference to FIGS. 3 and 4.

Figure 3:
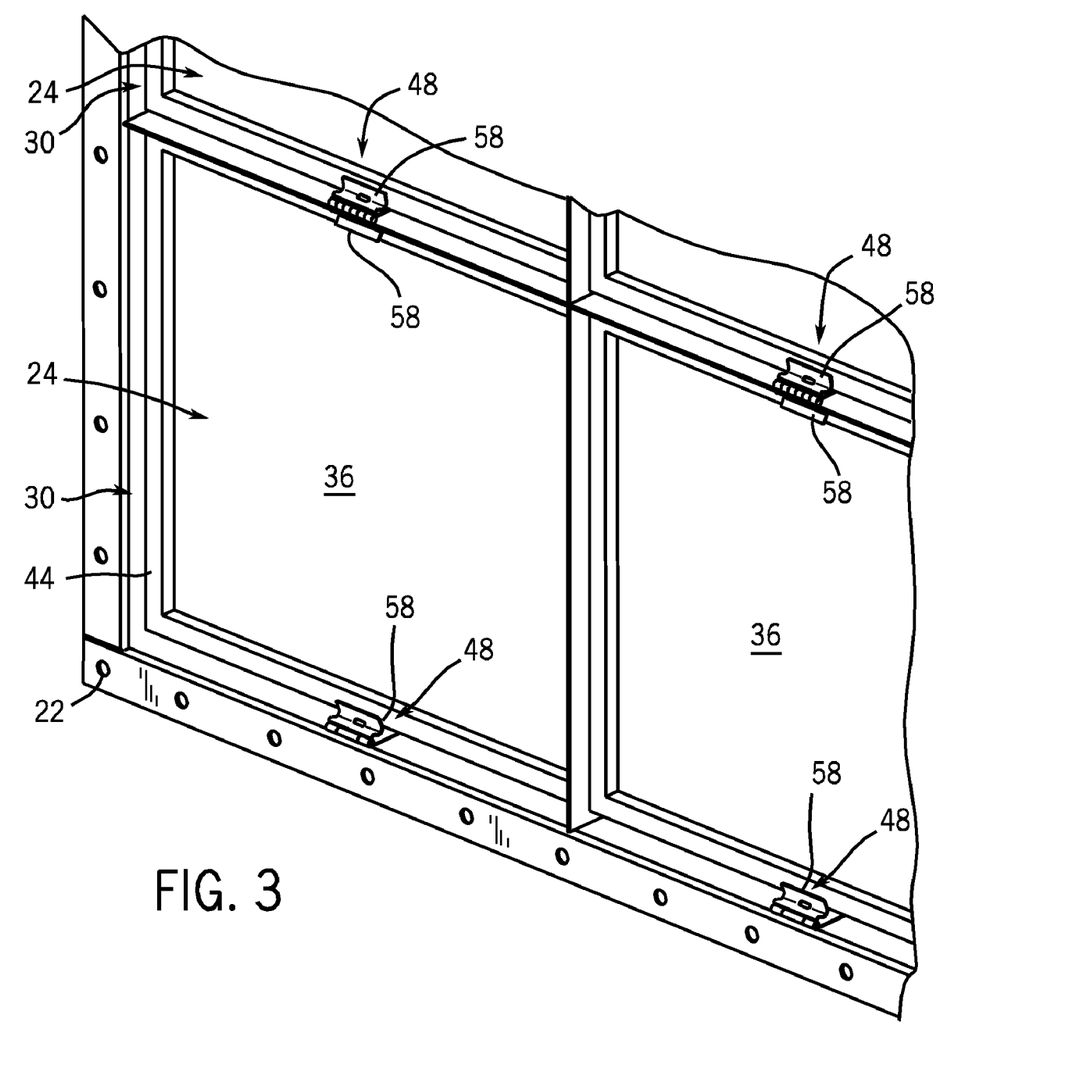
FIG. 3 is a close-up perspective view of the filter frame of FIG. 2, illustrating embodiments of the filter latches shown in FIG. 2.

FIG. 3 is a close-up perspective view of the filter frame of FIG. 2, illustrating an embodiment of the filter latches 48 shown in FIG. 2. As shown in FIG. 3, the filter latches 48 are coupled to the frame 22 and include retention plates 58 that may swing outward into a released position or inward into a retained position. When swung outward to the released position, the retention plates 58 are positioned away from the filter cell 30 to allow removal or insertion of a filter 46 into the filter cell 30 without interference from the latch 48. When swung into the retained position, the retention plates 58 hold the filters 24 in place by pressing the sealing flange 44 against the sealing face 34, applying a compressive force to the sealing flange 44, as will be explained further below. The total compressive force holding the sealing flange 44 against the sealing face 34 may be approximately 61 kilograms, per filter. Each filter 24 may be held in place by two or more filter latches 48. In certain embodiments, each filter 24 is held by four latches 48. Furthermore, the filter latches 48 may be coupled to the vertical support panels 26, the horizontal support panels 28, or both. Additionally, the filter latches 48 located between laterally adjacent filter cells 30 may compress at least two of the filters 24, while the filter latches 48 located at an outer edge of the frame 22 may compress only one filter 24. The filter latches 48 may be better understood with reference to FIG. 4.

Figure 4:
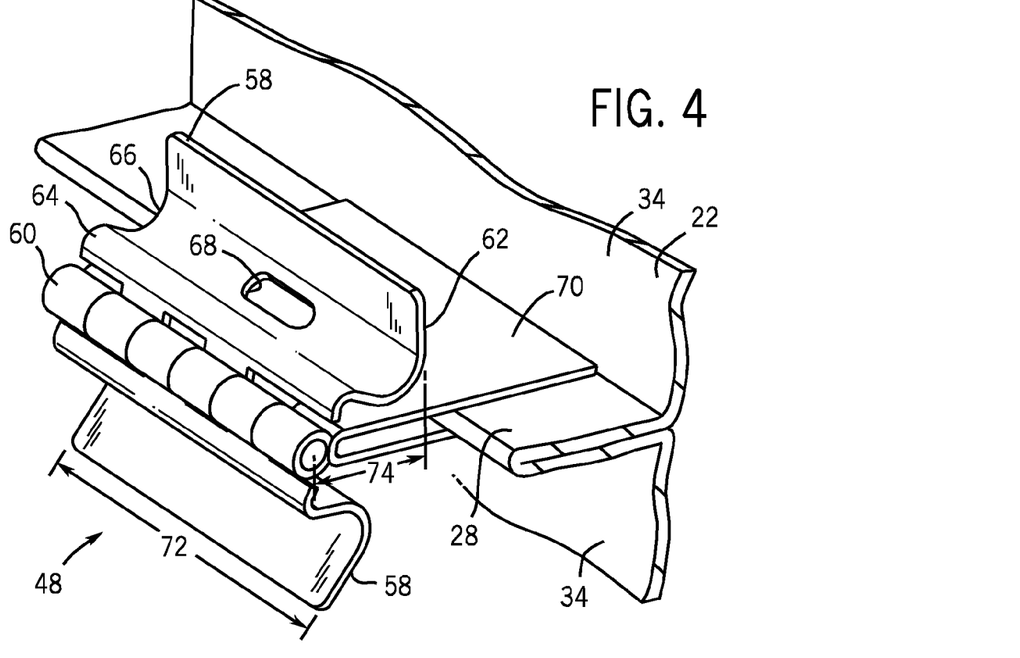
FIG. 4 is a close-up perspective view of an embodiment of the filter latches shown in FIG. 3.

FIG. 4 is a close-up perspective view of an embodiment of one of the filter latches 48 shown in FIG. 3. As is more clearly shown in FIG. 4, filter retention plates 58 may be rotatably coupled to and supported by a hinge 60, which allows the retention plates 58 to swing outward to a released position or inward to the retained position. In some embodiments, the hinge 60 may be described as a wing-style latch 48, having wings (i.e. retention plates 58) that may move independently to secure or release the adjacent filters 24. In some embodiments, the hinge 60 may be secured to the frame 22 by a securing arm 70 fixed to the hinge 60 at one end and fixed to the frame 22 at the opposite end. The securing arm 70 may be u-shaped and configured to slide over and straddle a horizontal support panel 28 or vertical support panel 26 of the frame 22. Furthermore, the securing arm 70 may be riveted, welded or otherwise permanently fixed to the frame 22. In other embodiments, the hinge 60 may be secured directly to the frame 70 without the use of the securing arm 70. It will be appreciated that the latch 48 described herein includes no loose parts, i.e. parts that are easily removable such as nuts or bolts.

The latch 48, including the retention plates 58 and the hinge 60, may be made of any suitable material such as rigid plastic, steel or aluminum. In some embodiments, the filter retention plate 58 may be resilient, and the degree of resiliency may depend on the gasket material and the desired level of compression. For example, filter retention plate 58 may include ASTM A 227 or 228 spring steel. The length 72 of the retention plates 58 may be approximately 1 to 3 inches or greater, and the depth 74 of the hinge, i.e. the distance from the axis of the hinge to the retention surface 62, may be approximately 1 inch or greater. It will be appreciated that the latch 48 dimensions described herein are intended merely to provide context and are not intended to be a limitation of the present invention. For example, in some embodiments, the latch 48 may extend the entire width or height of the filter cell 30 and include two or more hinges 60.

The retention plates 58 may also include a grasping mechanism that enables an operator of the latch 48 to release the retention plate 58 after it has been swung into the latched or retaining position. For example, in some embodiments, the retention plate 58 may include an opening 68 that enables a user of the latch 48 to grip the retention plate 58 with a tool and apply a torque sufficient to release the retention plate 58 from the retaining position.

As is also more clearly shown in FIG. 4, the end of the retention plate 58 opposite the hinge 60 may include a flat filter retention surface 62, and the retention plate 58 may extend from the hinge 60 to the filter retention surface 62 with a curve resembling an "s" shape. More specifically, the filter retention plate 58 may have an outwardly curved portion 64 near the hinge 60 and an inwardly curved portion 66 near the filter retention surface 62. The s-shape of the retention plate 58 may provide an over-center action that enables the filter retention plate 58 to lock into position against the sealing flange 44. Additionally, the inwardly curved portion 66 near the filter retention surface 62 also provides a camming action that gradually compresses the sealing flange 44 as the retention plate is swung into the retaining position. Both the over-center action and the camming action of the latch 48 will be explained further below with reference to FIGS. 5 and 6.

Figure 5:
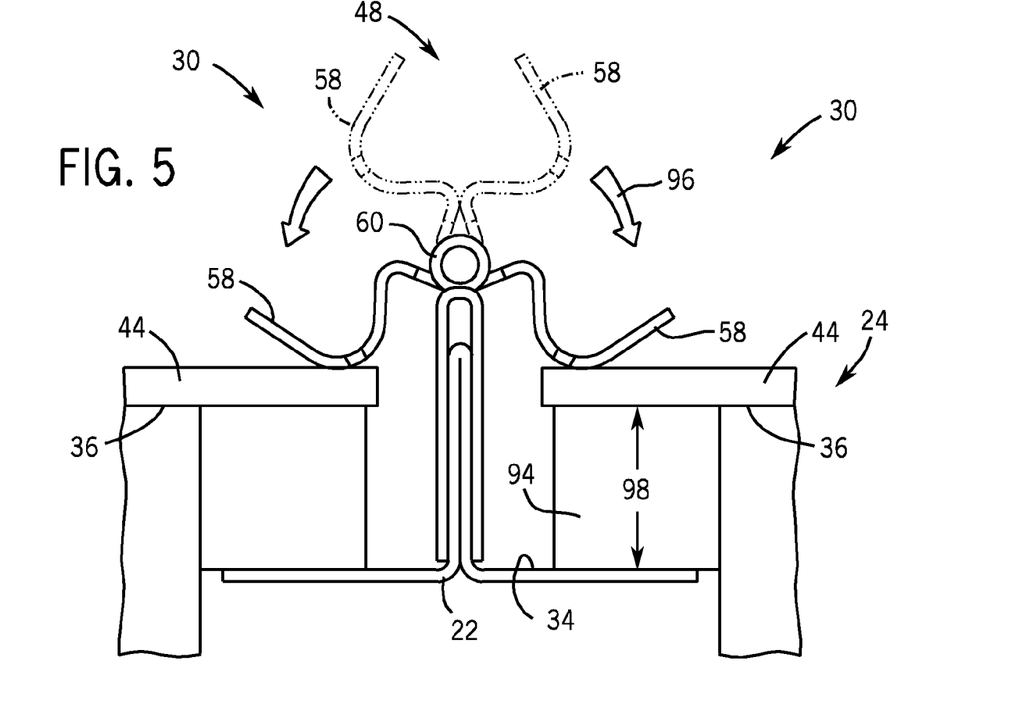
FIGS. 5 and 6 are side views of an embodiment of the filter latch shown in FIG. 4 at various rotational orientations.
Figure 6:
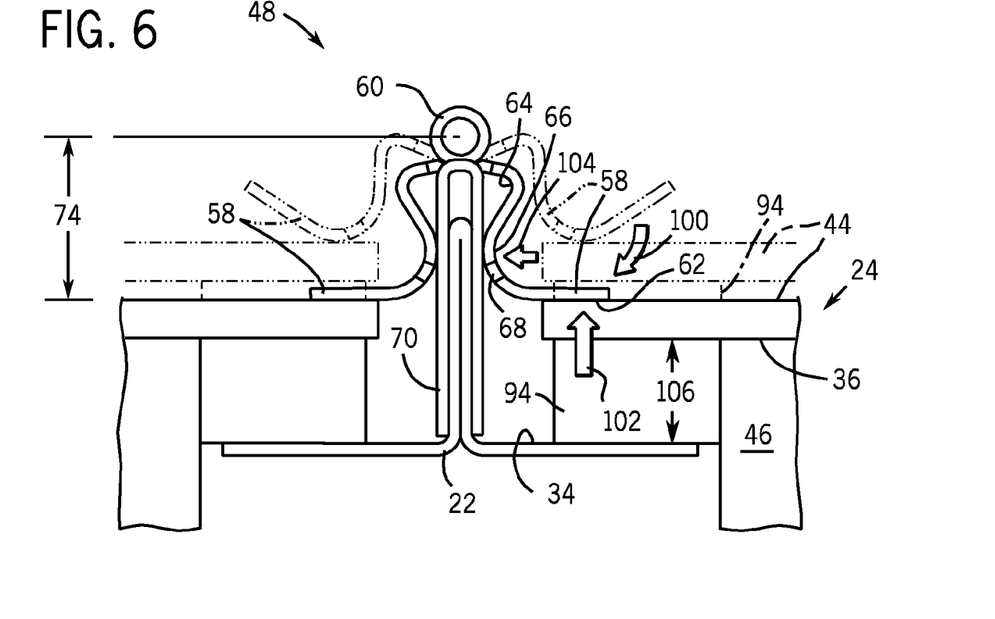

FIGS. 5 and 6 illustrate the latch 48 shown in FIGS. 2-4 as the retention plates 58 progress rotationally inward about the hinge 60 toward the retaining position. Turning first to FIG. 5, a cross-sectional side view of the latch 48 disposed about two adjacent filter cells 30 is shown. As described above in relation to FIG. 2, the filter 24 may include a sealing flange 44 disposed about the rim of the outward face 36 of the filter 24. The sealing flange 44 may include a rigid material, such as steel, aluminum or rigid plastic. As more clearly shown in FIG. 5, the filter 24 may also include a gasket 94 disposed between the sealing flange 44 and the sealing face 34. The gasket 94 may include a resilient, compressible material such as foam or rubber, for example. As will be described below, the retention plate 58 may provide an tight seal between the sealing flange 44 and the sealing face 34 by rotating inward toward the filter 24 and compressing the gasket 94.

The dotted line shown in FIG. 5 illustrates the retention plate 58 in an outwardly swung position that allows for convenient insertion or removal of the filters 24 without interference from the latch 48. As indicated by the arrow 96, the retention plate 58 may be swung inward about the hinge 60 toward the filter 24 until the retention plate 58 first contacts the top of the sealing flange 44 as shown by the solid line representation of the retention plate 58. At this position, the gasket 94 is not yet under compression and may have a resting, i.e. uncompressed, height 98 of approximately 5 to 15 millimeters or greater.

Turning now to FIG. 6, the dotted lines shows the retention plate 58 at the point where the retention plate 58 first contacted the sealing flange 44 prior to compression of the gasket 94, as shown above in FIG. 5. From this position, subsequent inward rotation of the retention plate 58, as indicated by the arrow 100, will compress the filter gasket 94, simultaneously beginning to engage the over-center action and the camming action of the latch 48. As shown by the solid line representation of the filter retention plate 58, the filter retention plate 58 locks into a retaining position when the inwardly curved portion 66 of the filter retention plate 58 abuts the securing arm 70. At this position, the gasket 94 exerts an upward force on the filter retention surface 62 that locks the retention plate 58 in place, abutting the filter retention surface 62. The retention plate 58 locks into place because of the s-shape of the latch. More specifically, the upward force 102 on the retention surface 62, urges the retention plate 58 to bend at the outwardly curved portion 64 and the inwardly curved portion 66. However, the bending of the retention plate 58 is inhibited by both the hinge 60 and the securing arm 70, resulting in a net inward rotational force 104 toward the securing arm 70. Therefore, the s-shape of the filter retention plate 58 causes the upward force 102 on the retention surface 62 to be translated into an inward rotational force 104 toward the securing arm 70, thus spring-biasing the retention plate 58 into place.

As mentioned above, the s-shape of the retention plate 58 will also provide an over-center action. The over-center action of the latch describes the characteristic of the latch 48 wherein the latch 48 will tend to resist being urged into a retaining position (e.g., solid lines in FIG. 6) until the latch 48 moves past a center point, after which the latch 48 will tend to be urged into the retaining position. More specifically, as the retention plate 58 rotates inward 100 toward the filter 24 from the point of first contact (e.g., dashed lines in FIG. 6), the gasket tends to resist compression, resulting in an outward rotational force on the retention plate 58. At a certain point in the inward rotation of the retention plate 58, the retention plate 58 is at a center point wherein the outward rotational force 102 caused by the gasket 94 is balanced by the inward rotational force 104 caused by the s-shaped retention plate 58 as described above. As the retention plate 58 is rotated 100 by the user past the center point, the net rotational force applied to the retention plate 58 turns inward, toward the retaining position.

As also mentioned above, the s-shape of the retention plate 58 provides a camming action. The camming action describes the characteristic of the latch 48 provided by the outwardly curved surface 64 wherein the compression of the filter gasket 94 against the sealing face 34 increases gradually as the latch 48 is rotated 100 into the retaining position. More specifically, as the retention plate 58 is rotated 100 into the retaining position, the curved portion 66 of the retention plate 58 engages the sealing flange 44 and applies a gradually increasing compressive force on the sealing flange 44 and the gasket 94, thus gradually reducing the height of the gasket 94. The gasket compression may be any level of compression that is sufficient to create an air-tight seal between the sealing flange 44 and the sealing face 34. In some embodiments, the gasket 94 may be compressed by approximately 10, 20, 30, 40, 50, 60, 70, 80, or 90 percent. For example, the gasket 94 may be compressed by approximately 50 percent and, and the fully compressed height 106 may be approximately 2 to 10 millimeters or greater. Furthermore, it will be appreciated that the level of compression applied to the gasket is predetermined by the depth 74 of the retention plate 58 and the distance between the hinge 60 and the sealing surface 34.

Figure 7:
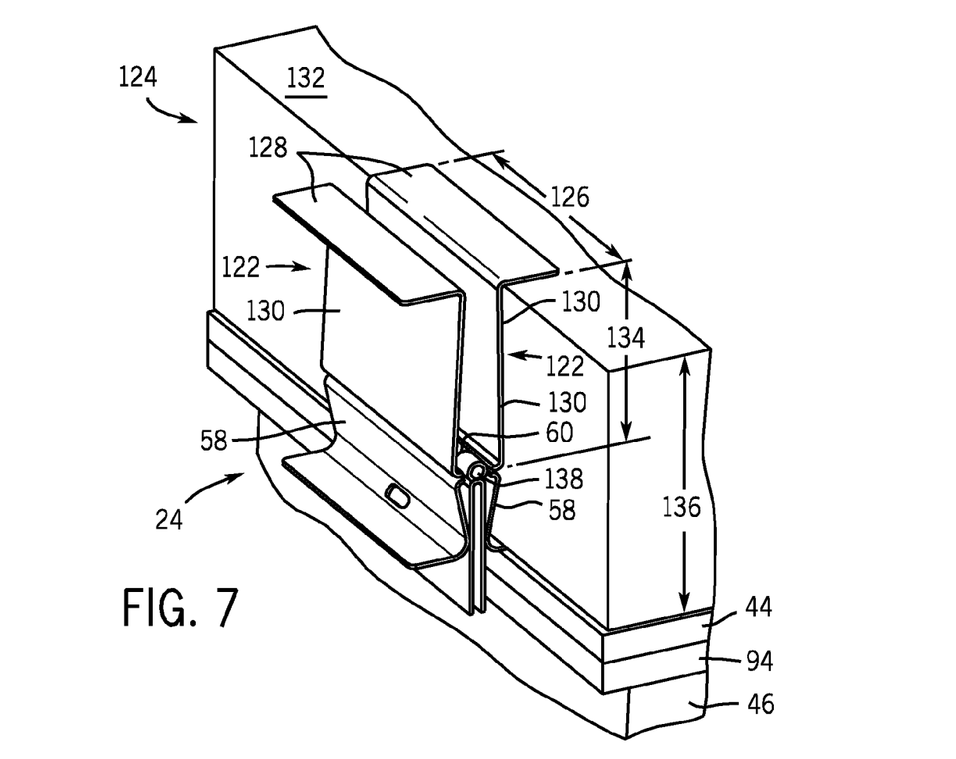
FIG. 7 is a perspective view of an embodiment of a filter latch configured to retain first and second filters in a parallel arrangement.

To release the latch 48 from the retaining position, the user may apply an outward force (e.g., opposite from arrow 100) to the retention plate 58 that overcomes the inward force provided by the resiliency of the gasket 94 and the s-shape of the retention plate 58. Accordingly, as discussed above in relation to FIG. 4, the retention plate 58 may include a gripping mechanism, such as the opening 68, that enables a user of the latch 48 to apply sufficient outward force to the retention plate 58 to release the retention plate 58 from the retaining position Another embodiment of the latch 48 will be described below with reference to FIGS. 7-10. Turning first to FIG. 7, an embodiment of a latch 48 is shown that includes a set of pre-filter arms 122 configured to hold a pre-filter 124 outwardly adjacent to the main filter 24. For purposes of the present description, the term "outwardly adjacent" is used to describe any filter that is disposed in a parallel or stacked configuration over another filter as opposed to side-by-side. FIG. 7 illustrates the latch 48 in a retaining position relative to the main filter 24 and the pre-filter 124. For clarity, the frame 22 and adjacent filter cells 30 are not shown.

As shown in FIG. 7, the pre-filter arms 122 may be rotatably coupled to and supported by the hinge 60. As with the retention plates 58, the pre-filter arms 122 may be made of any suitable metal such as steel or aluminum. The length 126 of the pre-filter arms 122 may be approximately equal to the length 72 of the retention plates 58. In other embodiments, however, the length 126 of the pre-filter arms 122 may be sufficiently greater than the length 72 of the retention plates 58 to enable the pre-filter arms 122 to include an aperture through which the retention plates 58 may rotate, thereby reducing rotational interference between the retention plates 58 and the pre-filter arms 122.

In some embodiments, the pre-filters 124 may be flexible and may not include a sealing flange or gasket for providing an air-tight seal. As such, the pre-filter arms 122 may not compress the pre-filters 124. Rather, the pre-filter arms 122 may simply hold the pre-filters 124 in place against the main filter 24. Accordingly, as shown in FIG. 7, the pre-filter arms 122 may be L-shaped and may include a retention arm 128 coupled at approximately a ninety degree angle to a positioning arm 130. The positioning arm 130 may rotate about the hinge 60 to position the retention arm 128 over the outward surface 132 of the pre-filter 124, as will be described further below in reference to FIGS. 8-10. The length 134 of the positioning arm 130 may depend on the depth 136 of the pre-filter 124 and may be any length suitable for positioning the retention plate 128 over the outward surface 132 of the pre-filter 124.

It should be noted that the latch 48 embodiment describe in FIG. 7 also includes no loose parts. Furthermore, the latch 48 described herein provides a simple, inexpensive method for upgrading the latch 48 to include a pre-filter holding arm 122. For example, to upgrade from an embodiment that does not include pre-filter arms 122 to one that does, the entire latch 48 would not be replaced. Rather, the user may simply add the pre-filter arms 122 to the existing latch 48 by removing the rod 138 from the hinge, inserting the two new pre-filter arms 122, and reinserting the rod 138.

Figure 8:
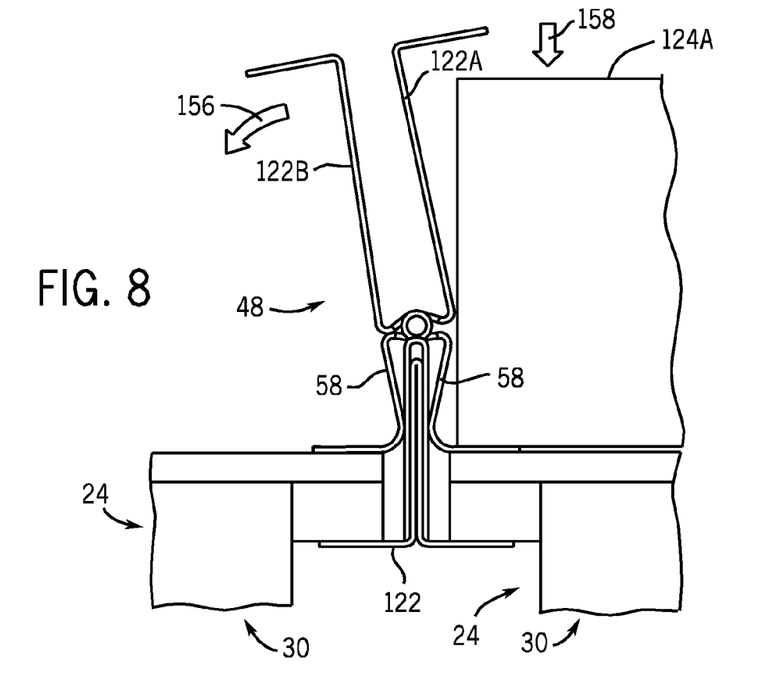
FIGS. 8-10 are side views of an embodiment of a filter retaining method using the filter latch shown in FIG. 7.
Figure 9:
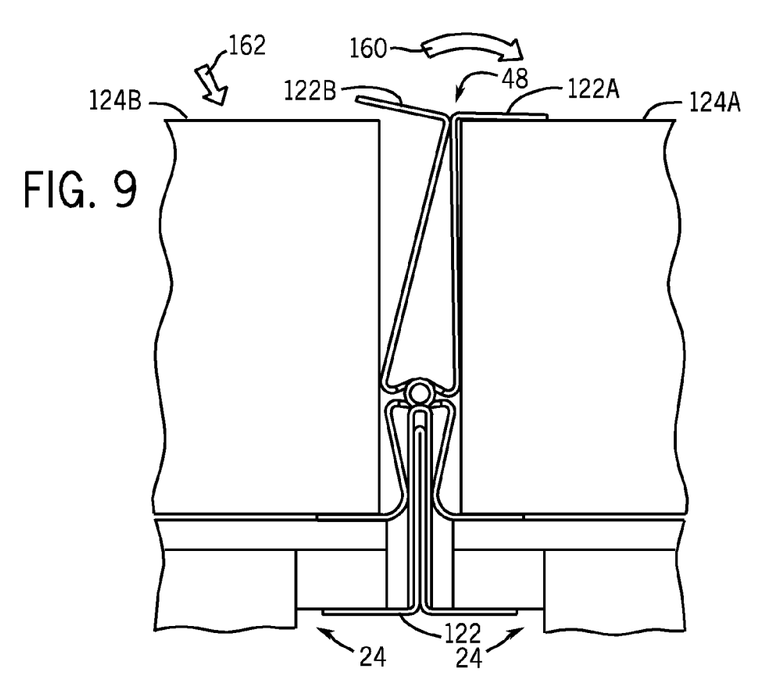
Figure 10:
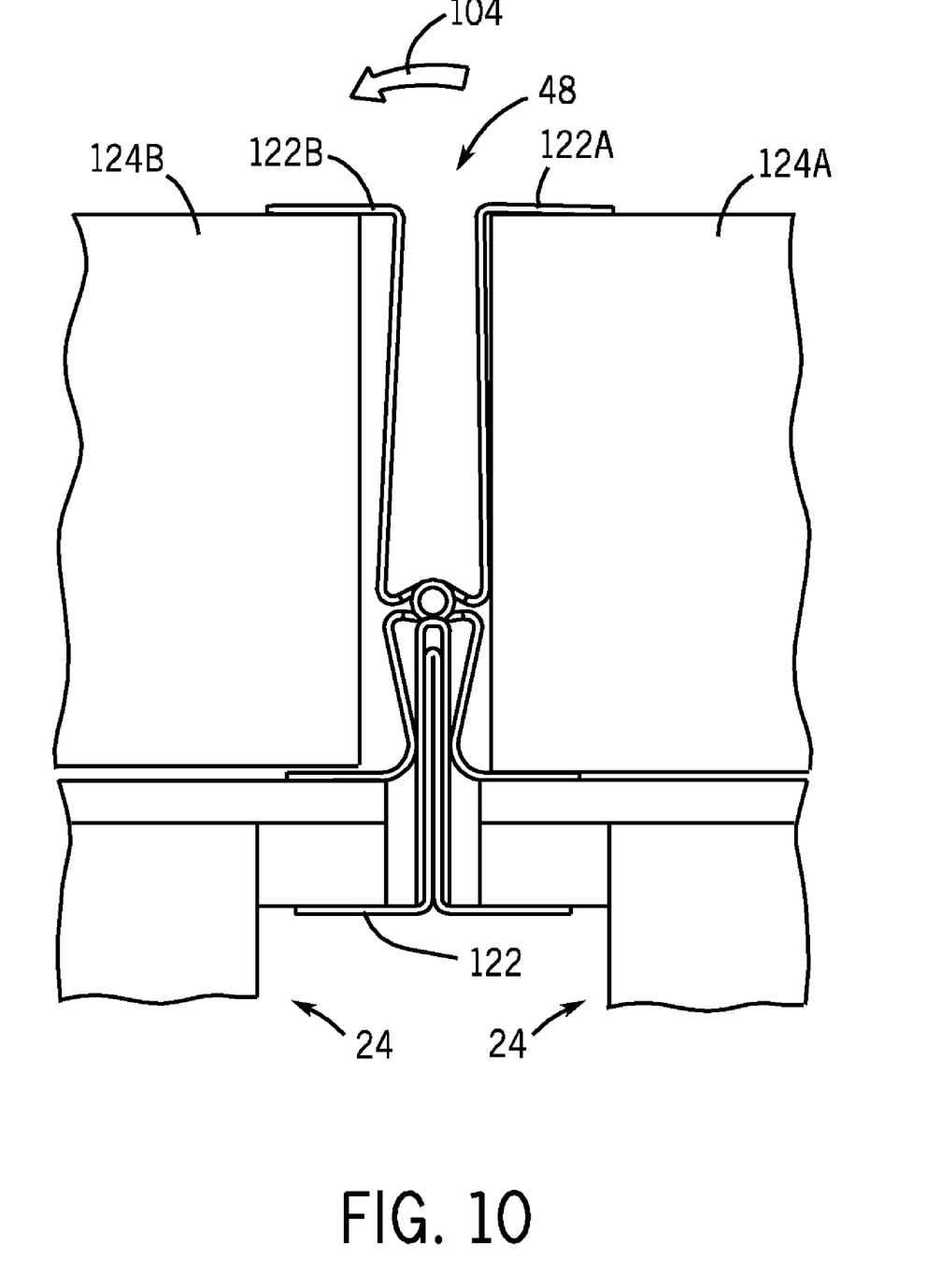

Turning now to FIGS. 8-10, a method of inserting or removing a set of pre-filters 124 is shown. Turning first to FIG. 8, a cross-sectional side view of the latch 48 is shown. For the forgoing description, the latch 48 will be described as including a first pre-filter arm 122A for retaining a first pre-filter 124A and a second pre-filter arm 122B for retaining a second pre-filter 124B. As shown in FIG. 8, the retention plates 58 are in the retaining position, compressing the main filters 24 into the adjacent filter cells 30. The pre-filters 124 may then be installed one at a time. As shown in FIG. 8, both of the pre-filter arms 122 may be rotated counterclockwise away from the first pre-filter 124A as indicated by the arrow 156, thus reducing interference between the pre-filter arms 122 and the pre-filter 124A to be installed. A first pre-filter 124A may then be installed as indicated by the arrow 158. After the first pre-filter 124A is installed, a second pre-filter 124B may be installed as shown in FIG. 9.

As shown in FIG. 9, both of the pre-filter arms 122 may next be swung clockwise, as indicated by the arrow 160, so that the first pre-filter arm 122A retains the first pre-filter 124A and the second pre-filter arm 122B is swung out of the way of the second pre-filter 124B to be installed. As shown in FIG. 9, the second pre-filter arm 122B may have a limited range of rotation due to the presence of the first pre-filter 124A, which may inhibit the rotation of the first pre-filter arm 122A. Due to the limited degree of rotation available to the second pre-filter arm 124B, the second pre-filter 124B may be slid under the second pre-filter arm 122B, as indicated by the arrow 162. In some embodiments, the flexibility of the pre-filters 124 may aid the insertion of the second pre-filter 124B. In alternative embodiments, the filter cells 30 may be spaced apart to provide a greater range of rotation for the second pre-filter arm 122B when the first pre-filter 124A is installed. In this way, the range of rotation may be sufficient to substantially reduce or eliminate the interference between the second pre-filter arm 122B and the second pre-filter 124B, thus enabling the second pre-filter 124B to be inserted more easily. After inserting the second pre-filter 124B, the second pre-filter arm 122B may be rotated counterclockwise toward the second pre-filter 124B, as indicated by the arrow 164.

Turning briefly to FIG. 10, the latch 48 is shown in the latched or retained position. As shown in FIG. 10, the second pre-filter arm 122B has been rotated counterclockwise 160 toward the second pre-filter 124B to secure the second pre-filter 124B. The process described above in reference to FIGS. 8-10 may then be repeated for each of the pre-filters 124B. The insertion of the pre-filters 124 may be accomplished one row at a time or one column at a time, depending on the orientation and placement of the latches 48 on the filter frame 22.

The filter latching system and method described herein provides several advantages. For example, the latch itself is small, simple, easy to fabricate, and therefore inexpensive. Additionally, unlike other filter retention devices, the latching system herein does not include any loose or easily detachable parts, thereby reducing the risk that a part could become free and damage the turbine. Furthermore, the clamping pressure applied to the filter gasket is reliable and repeatable and does not depend on the skill of the installer, because the force applied by the latch depends on the dimensions of the latch itself. Moreover, the filter latch described herein is faster and simpler to operate than other filter retention devices such as those that use bolted connections. The faster, simpler operation of the latch makes the overall filter removal and installation process much faster, particularly when repeated for the dozens or even hundreds of filters in a filter house.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a filter assembly, comprising:
a plurality of filters;
a filter holding frame, comprising:
a plurality of filter cells; and
a plurality of fasteners, wherein each fastener comprises:
a first arm coupled to the filter holding frame at a hinge, wherein the first arm comprises a first curved surface, rotates about the hinge to slide the first curved surface along a first filter to gradually compress the first filter from a released position to a retained position relative to a first filter cell; and
a turbine engine configured to receive filtered air from the filter assembly.

2. The system of claim 1, wherein the first arm comprises an over-center action mechanism.

3. The system of claim 1, wherein the first arm comprises an S-shaped plate extending outwardly from the hinge and the S-shaped plate comprises the first curved surface.

4. The system of claim 1, wherein the first arm comprises a resilient plate having the first curved surface configured to spring bias the first filter.

5. The system of claim 1, wherein the hinge is disposed along an edge of the first filter cell, and the first arm rotates toward and away from the edge.

6. The system of claim 1, wherein each fastener comprises the first arm and a second arm coupled to the hinge, the second arm comprises a second curved surface and the second arm rotates about the hinge to slide the second curved surface along a second filter to gradually compress the second filter from another released position to another retained position relative to a second filter cell.

7. The system of claim 6, wherein hinge is disposed along a divider between the first and second filter cells, and the first and second arms rotate toward and away from one another.

8. The system of claim 7, comprising third and fourth arms coupled to the hinge, wherein the third and fourth arms rotate toward and away from one another to secure and release third and fourth filters on opposite sides of the divider.

9. The system of claim 7, comprising a U-shaped mount disposed between the first and second arms, wherein the U-shaped mount is configured to extend about the divider.

10. A system, comprising:
a filter holding frame configured to support a plurality of filters, wherein the filter holding frame comprises:
a first filter cell;
a second filter cell;
a divider between the first and second filter cells; and
a latch coupled to the divider, wherein the latch comprises first and second arms rotatable toward and away from one another and the divider, the first arm is configured to progressively compress a first filter into the first filter cell during rotation of the first arm toward the first filter, and the second arm is configured to progressively compress a second filter into the second filter cell during rotation of the second arm toward the second filter.

11. The system of claim 10, wherein the first arm comprises a first over-center action mechanism and the second arm comprises a second over-center action mechanism.

12. The system of claim 10, wherein the first arm comprises a first S-shaped plate extending outwardly from a hinge, and the second arm comprises a second S-shaped plate extending outwardly from the hinge.

13. The system of claim 10, wherein the latch comprises third and fourth rotatable arms, the third rotatable arm is configured to retain a first pre-filter outwardly adjacent to the first filter, and the fourth rotatable arm is configured to retain a second pre-filter outwardly adjacent to the second filter.

14. The system of claim 10, wherein the first and second arms comprise curved plates with curved portions configured to gradually compress the first and second filters into the first and second filter cells during rotation of the first and second arms.

15. The system of claim 14, wherein the first and second filters comprise gaskets configured to be compressed by the first and second arms to create an air-tight seal between first and second the filters and the filter holding frame.

16. The system of claim 15, wherein the curved portions of the first and second arms are configured to translate an upward force provided by the compression of the gasket into an inward rotational force that locks the first and second arms against the divider.

17. A system, comprising:
a filter latch, comprising:
a hinge; and
a first arm coupled to the hinge, wherein the first arm comprises a first S-shaped plate rotatable about the hinge, and the first S-shaped plate is configured to progressively compress a first filter into a first filter cell in a filter frame via a first sliding engagement of the first filter along a first curved surface of the first S-shaped plate.

18. The system of claim 17, comprising a second arm coupled to the hinge, wherein the second arm comprises a second S-shaped plate rotatable about the hinge, and the second S-shaped plate is configured to progressively compress a second filter into a second filter cell laterally adjacent to the first filter cell via engagement of the second filter along a second curved surface of the second S-shaped plate.

19. The system of claim 17, wherein the first S-shaped plate provides an over-center action.

20. The system of claim 17, comprising one or more L-shaped arms coupled to the hinge, wherein the L-shaped arms are rotatable about the hinge to retain at least one pre-filter outwardly adjacent to the first filter and/or the second filter.

21. The system of claim 1, wherein the first curved surface curves in a circumferential direction about a rotational axis of the hinge, and a distance between the first curved surface and the rotational axis gradually increases in the circumferential direction about the rotational axis.

22. The system of claim 2, wherein the over-center action mechanism is configured to bias the first curved surface away from the first filter before the first arm rotates sufficient to reach a center or balance point, and the over-center action mechanism is configured to bias the first curved surface toward the first filter after the first arm rotates beyond the center or balance point.

23. The system of claim 22, wherein the over-center action mechanism comprises an S-shaped portion of the first arm.

24. The system of claim 17, wherein the first curved surface curves in a circumferential direction about a rotational axis of the hinge, and a distance between the first curved surface and the rotational axis gradually increases in the circumferential direction about the rotational axis.

25. The system of claim 19, wherein the over-center action of the first S-shaped plate is configured to bias the first curved surface away from the first filter before the first arm rotates sufficient to reach a center or balance point, and the over-center action of the first S-shaped plate is configured to bias the first curved surface toward the first filter after the first arm rotates beyond the center or balance point.

26. The system of claim 17, wherein the filter latch is a turbine filter latch.

27. A system, comprising:
a turbine filter assembly, comprising:
a plurality of filters;
a filter holding frame, comprising:
a plurality of filter cells; and
a plurality of fasteners, wherein each fastener comprises:
a first arm coupled to the filter holding frame at a hinge, wherein the first arm rotates about the hinge to gradually compress a first filter from a first released position to a first retained position relative to a first filter cell; and
a second arm coupled to the filter holding frame at the hinge, wherein the second arm rotates about the hinge to gradually compress a second filter from a second released position to a second retained position relative to a second filter cell.

28. The system of claim 27, wherein the first arm comprises a first over-center action mechanism, and the second arm comprises a second over-action mechanism.

29. The system of claim 28, wherein the first over-action mechanism comprises a first S-shaped portion of the first arm, and the second over-action mechanism comprises a second S-shaped portion of the second arm.

30. The system of claim 29, wherein:

the first over-center action of the first S-shaped portion is configured to bias the first S-shaped portion away from the first filter before the first arm rotates sufficient to reach a first center or balance point, and the first over-center action of the first S-shaped portion is configured to bias the first S-shaped portion toward the first filter after the first arm rotates beyond the first center or balance point; and the second over-center action of the second S-shaped portion is configured to bias the second S-shaped portion away from the second filter before the second arm rotates sufficient to reach a second center or balance point, and the second over-center action of the second S-shaped portion is configured to bias the second S-shaped portion toward the second filter after the second arm rotates beyond the second center or balance point.

31. A system, comprising:

a turbine filter latch, comprising:

a hinge configured to couple to a turbine filter holding frame; and a first arm coupled to the hinge, wherein the first arm comprises a first curved surface that curves in a first circumferential direction about a rotational axis of the hinge, a first distance between the first curved surface and the rotational axis gradually increases in the first circumferential direction about the rotational axis, and the first arm is configured to rotate about the hinge to slide the first curved surface along a first filter in the turbine filter holding frame to gradually compress the first filter from a released position to a retained position relative to the turbine filter holding frame.

32. The system of claim 31, wherein the first arm comprises a first over-center action mechanism configured to bias the first curved surface away from the first filter before the first arm rotates sufficient to reach a first center or balance point, and the first over-center action mechanism is configured to bias the first curved surface toward the first filter after the first arm rotates beyond the first center or balance point.

33. The system of claim 31, comprising the turbine filter holding frame having a beam configured to extend along an edge of the first filter, wherein the rotational axis of the hinge extends lengthwise along the beam, the first arm is configured to rotate toward the beam to slide the first curved surface along the first filter to gradually compress the first filter from the released position to the retained position.

* * * * *